(12) United States Patent
Buglione et al.

(10) Patent No.: US 7,658,249 B2
(45) Date of Patent: Feb. 9, 2010

(54) HYBRID VEHICLE WITH INTEGRAL GENERATOR FOR AUXILIARY LOADS

(75) Inventors: Arthur J Buglione, Troy, MI (US); Del C Schroeder, Bloomfield Hills, MI (US); Edmund Tworkowski, Rochester Hills, MI (US)

(73) Assignee: Chrysler Group LLC, Auburn Hills, MI (US)

(*) Notice: Subject to any disclaimer, the term of this patent is extended or adjusted under 35 U.S.C. 154(b) by 0 days.

(21) Appl. No.: 11/685,471

(22) Filed: Mar. 13, 2007

(65) Prior Publication Data

US 2007/0151782 A1    Jul. 5, 2007

Related U.S. Application Data

(62) Division of application No. 10/839,468, filed on May 5, 2004, now Pat. No. 7,231,994.

(60) Provisional application No. 60/524,473, filed on Nov. 24, 2003.

(51) Int. Cl.
*B60K 1/00* (2006.01)
(52) U.S. Cl. .................. 180/65.31; 180/65.8
(58) Field of Classification Search .......... 180/65.2, 180/65.3, 65.8, 65.81; 219/202, 510; 191/12.2 A, 191/12.4; 433/21; 361/836, 623; 322/1; 62/243, 244
See application file for complete search history.

(56) References Cited

U.S. PATENT DOCUMENTS

| | | | |
|---|---|---|---|
| 1,380,942 A | | 6/1921 | Baldwin |
| 2,606,624 A | | 8/1952 | Chiotte |
| 3,641,672 A | * | 2/1972 | Kesling ............... 433/21 |
| 3,672,445 A | | 6/1972 | Carson |
| 3,761,727 A | | 9/1973 | Santilli |
| 4,079,304 A | * | 3/1978 | Brandenburg ............. 320/105 |
| 4,269,280 A | | 5/1981 | Rosen |
| 4,394,706 A | * | 7/1983 | Crafts .................. 361/836 |
| 4,785,227 A | | 11/1988 | Griffin |
| 4,797,602 A | | 1/1989 | West |
| 4,904,205 A | * | 2/1990 | Rice ..................... 439/504 |
| 5,034,571 A | * | 7/1991 | Galloway ............. 191/12.2 A |
| 5,204,991 A | | 4/1993 | Law |
| 5,343,970 A | | 9/1994 | Severinsky |
| 5,635,818 A | * | 6/1997 | Quintero ............... 320/105 |
| 5,667,710 A | * | 9/1997 | Kraemer ............... 219/202 |
| 5,735,770 A | | 4/1998 | Omote et al. |
| 6,102,144 A | | 8/2000 | Lutz |
| 6,107,691 A | | 8/2000 | Gore et al. |
| 6,140,780 A | | 10/2000 | Oshima et al. |
| 6,158,405 A | | 12/2000 | Masberg et al. |

(Continued)

FOREIGN PATENT DOCUMENTS

WO    WO 02/08574 A1    1/2002

*Primary Examiner*—Hau V Phan
(74) *Attorney, Agent, or Firm*—Ralph E. Smith

(57) ABSTRACT

A hybrid vehicle includes an internal combustion engine coupled to a combined starter/motor/generator which is, in turn, coupled to a transmission of the vehicle. The starter/motor/generator is coupled to a high voltage battery pack via an inverter and to a deployable power output panel for serving loads external to the vehicle. Whenever external loads are to be powered, a control unit automatically places the vehicle in PARK, or alternatively activates an electrical parking brake system to hold the vehicle stationary.

5 Claims, 10 Drawing Sheets

U.S. PATENT DOCUMENTS

| | | |
|---|---|---|
| 6,177,773 B1 | 1/2001 | Nakano et al. |
| 6,281,646 B1 | 8/2001 | Masberg et al. |
| 6,281,660 B1 | 8/2001 | Abe |
| 6,319,055 B1 * | 11/2001 | Conner, Jr. .................. 439/504 |
| 6,365,983 B1 | 4/2002 | Masberg et al. |
| 6,405,701 B1 | 6/2002 | Masberg et al. |
| 6,487,998 B1 | 12/2002 | Masberg et al. |
| 6,663,016 B2 | 12/2003 | Bien |
| 6,889,125 B2 | 5/2005 | Nakao et al. |
| 7,231,994 B2 * | 6/2007 | Buglione et al. ........... 180/65.3 |
| 2003/0189338 A1 | 10/2003 | Rose, Sr. |
| 2004/0189091 A1 | 9/2004 | Algrain et al. |

* cited by examiner

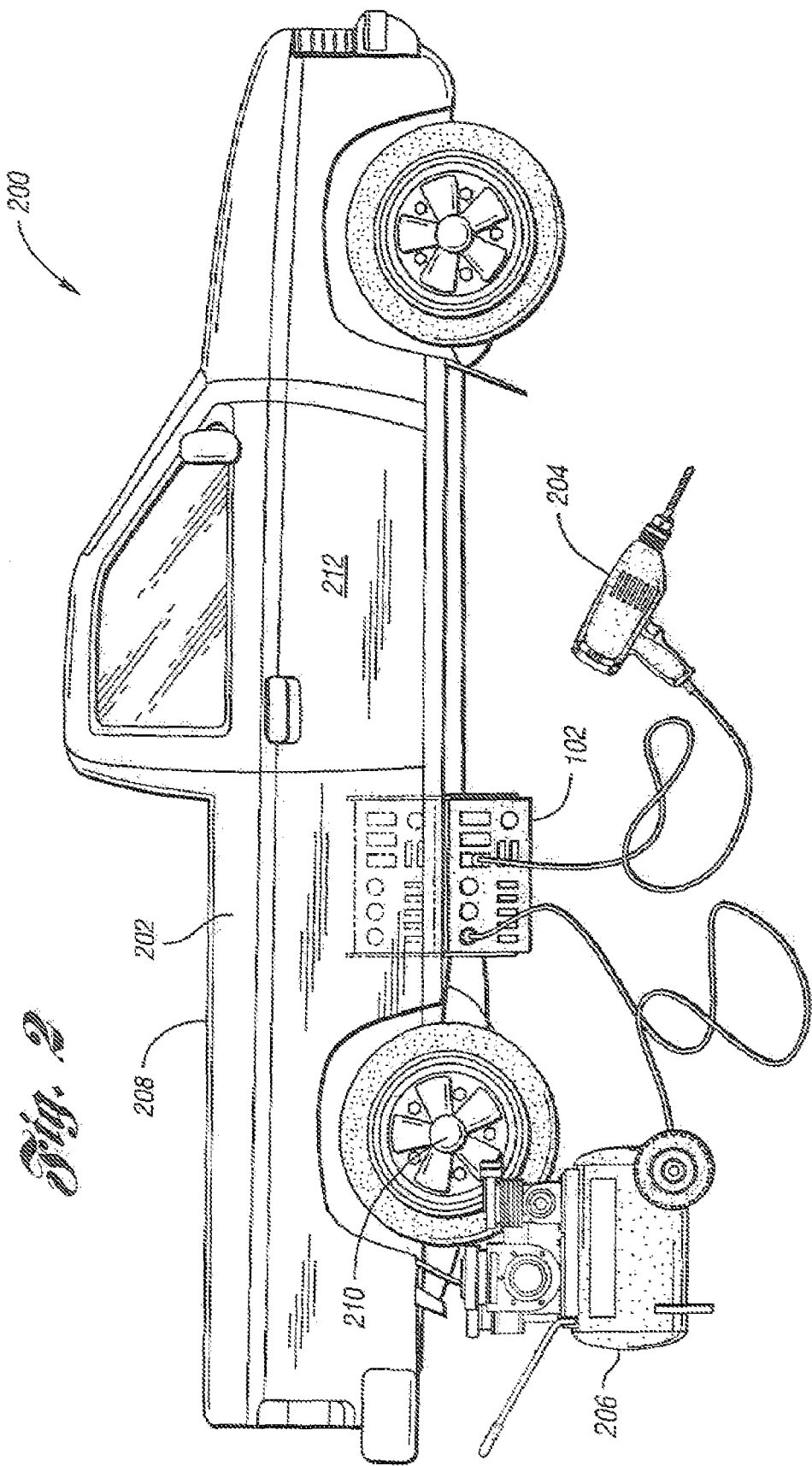

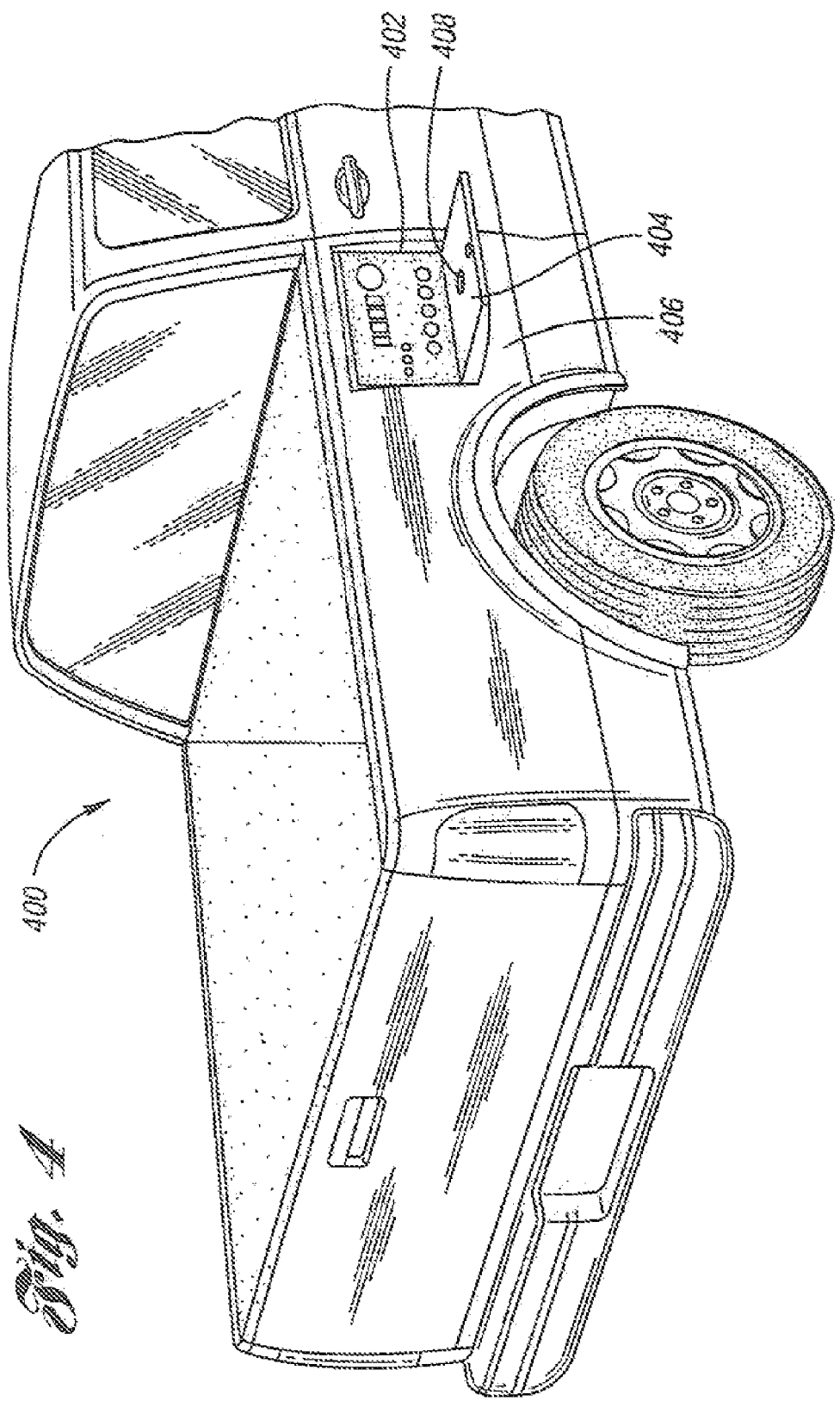

HYBRID VEHICLE WITH INTEGRAL GENERATOR FOR AUXILIARY LOADS

RELATED APPLICATIONS

This application is a divisional of U.S. patent application Ser. No. 10/839,468 filed May 5, 2004, now U.S. Pat. No. 7,231,994 which claims the benefit of U.S. Provisional Patent Application No. 60/524,473 filed Nov. 24, 2003.

BACKGROUND OF THE INVENTION

The invention generally relates to hybrid vehicles having dual drive train power sources including an internal combustion engine and an electrical motor. More specifically, the invention pertains to a hybrid vehicle having a combined starter/motor/generator coupled to an internal combustion engine of the vehicle.

Hybrid vehicles are known wherein drive train power is derived from a combination of an internal combustion engine with an electrically powered motor. The electric motor may be used as a source of charging current for its associated batteries when the motor is not being used to supply driving power to the vehicle.

Commercial vehicles, such as pickup trucks used by contractors or utility companies often are deployed to job sites not having commercial power available for performing auxiliary tasks at the work site. Prior approaches to providing such power have utilized separate portable generators, usually carried in the pickup box of the vehicle. Alternatively, to supply larger electrical loads, such portable generators must be towed in a separate vehicle behind the contractor's truck. The separate generators typically are not capable of producing increased power levels without a concomitant increase in generator size. There is a need for providing a power source for auxiliary loads from a vehicle wherein use of independent self-powered generator is eliminated.

SUMMARY OF THE INVENTION

In one aspect of the invention, a hybrid vehicle includes an internal combustion engine coupled for delivering power to a combined starter/motor generator. The hybrid vehicle is capable of three modes of powering the vehicle—internal combustion engine only, electric motor only and combined engine/motor power. A hybrid control module determines the mode of operation of the vehicle. The vehicle further includes at least one electrical outlet coupled for receipt of electric power for furnishing electric power to an auxiliary load.

In another aspect of the invention, the at least one electrical outlet is accessed via an electrical input/output panel which may be a deployable unit integral with a portion of the vehicle body or, alternatively, housed in a toolbox loaded in the cargo bed of the vehicle.

In yet another aspect of the invention, a method for placing a vehicle in an operative state suitable for supplying electrical power to at least one external load includes recognizing movement of a power distribution unit to a deployable state, holding the vehicle stationary, and placing the vehicle's transmission in a preselected gear for powering the electrical generator.

BRIEF DESCRIPTION OF THE DRAWING

The objects and features of the invention will become apparent from a reading of a detailed description, take in conjunction with the drawing, in which:

FIG. 2 is a perspective view of a pickup truck utilizing the hybrid powertrain of FIG. 1 and a deployable input/output panel for external electrical loads, the power received from a source integral with the drive train of the hybrid vehicle of the invention;

FIG. 4 is a perspective view of a third embodiment of a vehicle side-mounted input/output power panel for external electrical loads in accordance with the invention;

DETAILED DESCRIPTION

Figure 1:
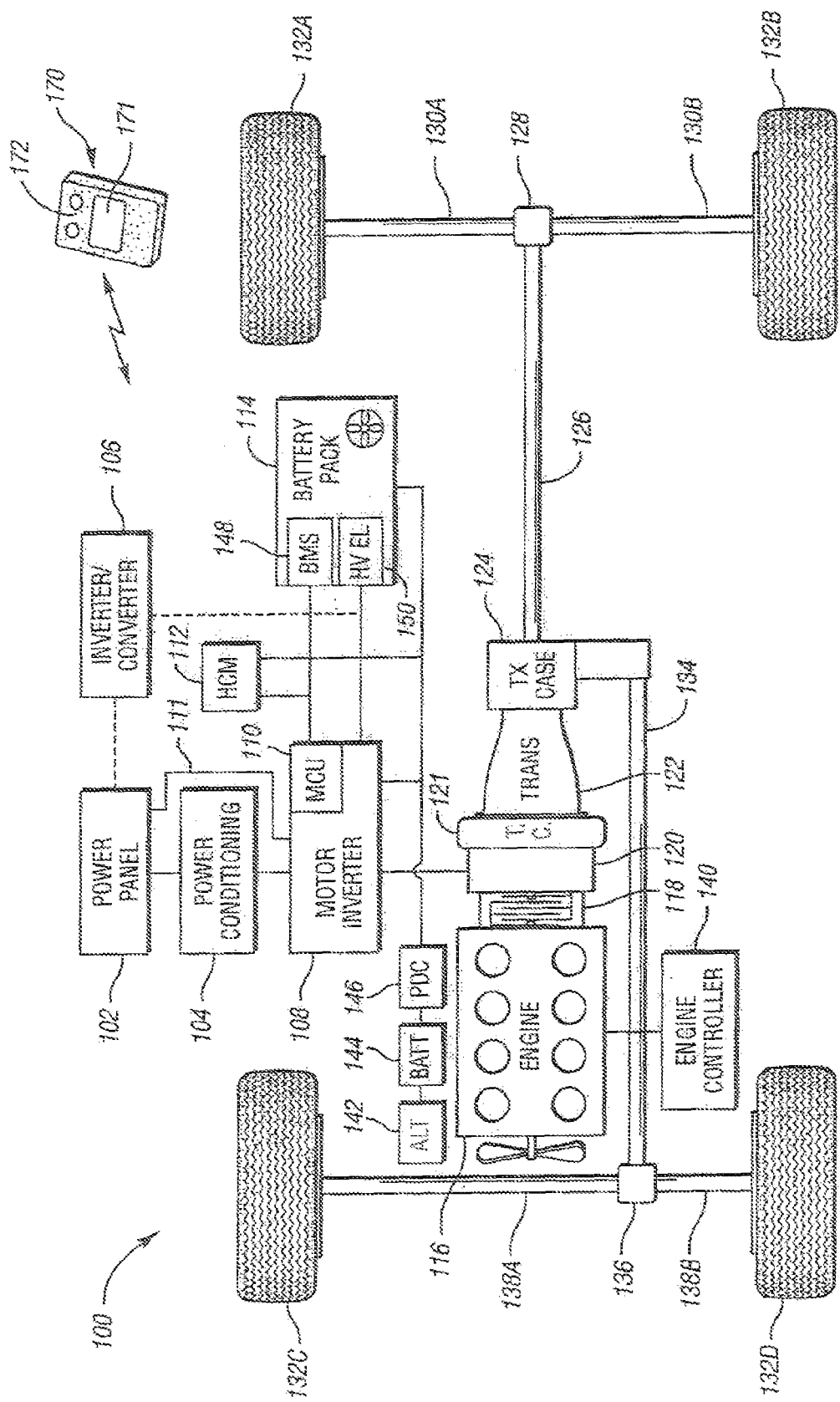
FIG. 1 is a bock diagram for a hybrid vehicle equipped with all-wheel drive and arranged in accordance with the principles of the invention.

With reference to FIG. 1, hybrid vehicle 100 utilizes a drive train comprised of internal combustion engine 116 coupled via clutch 118 to combination starter/motor/generator unit 120. Unit 120 is, in turn, coupled to a torque converter 121 which is coupled to transmission 122 which, in turn, is coupled to a transfer case 124. Transfer case 124 is operative in a conventional sense to deliver driving rotation to rear drive line 126 and/or front drive line 134. Rear drive line 126 is coupled via differential 128 to rear driving axles 130A and 130B, each associated respectively with rear wheels 132A and 132B.

In similar fashion, front drive line 134 transfers drive power through front differential 136 which provides drive power to front drive axles 138A and 138B which are respectively associated with front wheels 132C and 132D.

While vehicle 100 of FIG. 1 is shown as equipped with all-wheel or four-wheel drive, it is to be understood that the invention additionally is contemplated for use with a hybrid vehicle equipped with two-wheel drive—either front or rear. For example, for front two-wheel drive, transfer case 124, rear drive line 126 and differential 128 could be eliminated from vehicle 100. Similarly, for rear two-wheel drive, transfer case 124, front drive line 134 and differential 136 could be eliminated from vehicle 100.

Internal combustion engine 116 is controlled by a microprocessor-based engine controller 140 and also has associated therewith alternator 142, conventional automotive low voltage battery 144 and a power distribution center 146 wherein various power conducting leads are distributed to various elements of the vehicle via appropriate fuses.

Figure 1A:
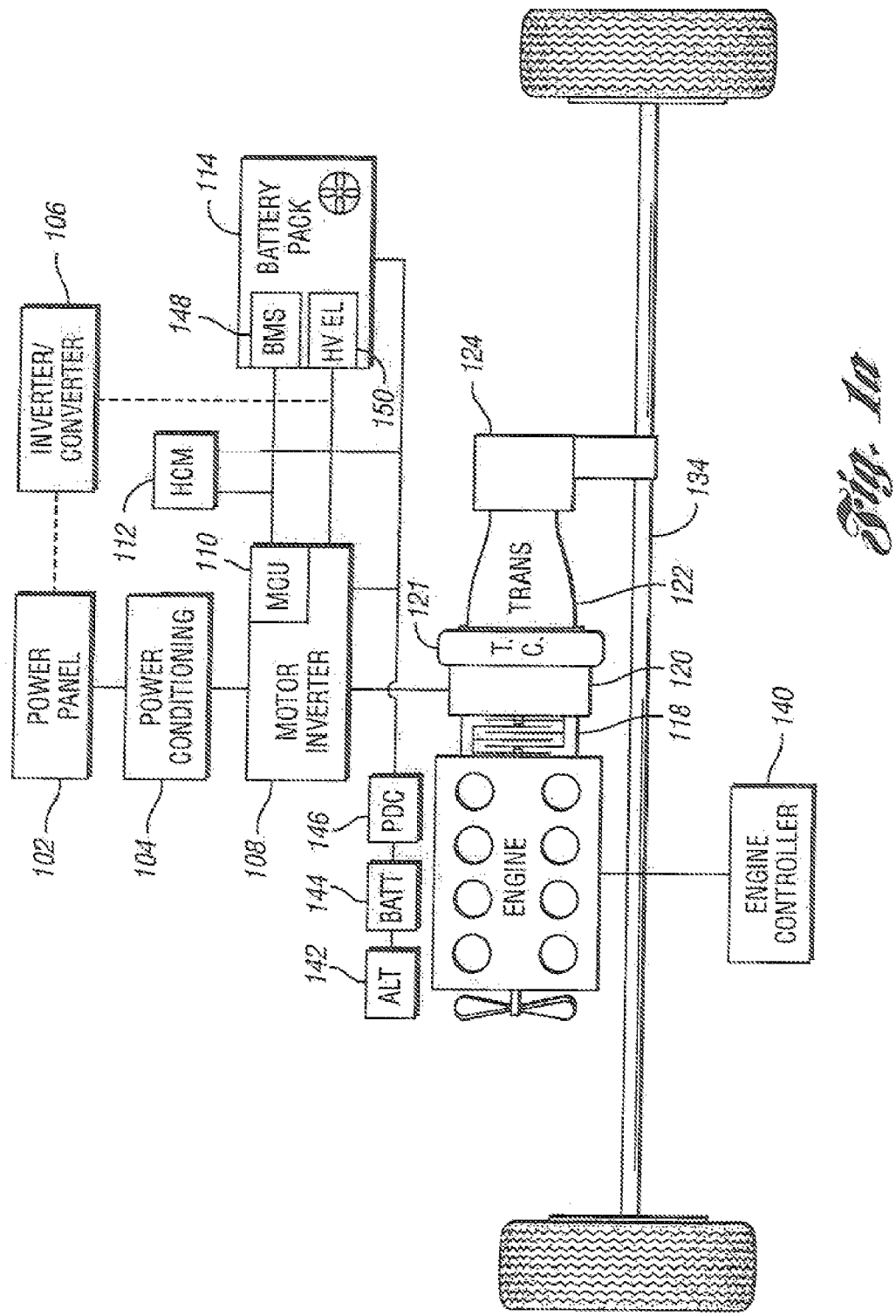
FIG. 1a is a block diagram for a hybrid vehicle equipped with an internal combustion engine mounted transversely to a longitudinal axis of the vehicle and arranged in accordance with the principles of the invention.

While vehicle 100 of FIG. 1 is shown with engine 116 conventionally mounted with its drive shaft parallel to, or coincident with, a longitudinal axis of the vehicle, it is to be understood that the invention is additionally contemplated for use with a hybrid vehicle having an engine mounted with its drive shaft transverse to the vehicle's longitudinal axis, as shown in FIG. 1a. This arrangement can be used with either two-wheel or four-wheel drive systems.

A supplemental DC power source comprised of a battery pack 114 for furnishing a preselected DC voltage level is used as the primary power source for the unit 120 when operating in the motor mode. Associated with battery pack 114 is a battery management system 148 and high voltage interface electronics 150.

Motor inverter circuitry 108 is under the control of a motor control unit 110 and functions to convert DC power delivered from battery pack 114 to an AC driving signal for unit 120 when operating in the motor mode. Additionally, inverter 108 will take AC energy generated by unit 120 when functioning in a generator mode and pass that power through power conditioning circuitry 104 to a deployable power panel 102 associated with vehicle 100. Power conditioning circuitry 104 basically "cleans up" the AC signal coming in and converts it to a smoother sinusoidal signal. For high power applications, power conditioning circuit 104 may be bypassed via lead or bus 111 between an output of inverter 108 and an input to power panel 102, as shown in FIG. 1.

Figure 1B:
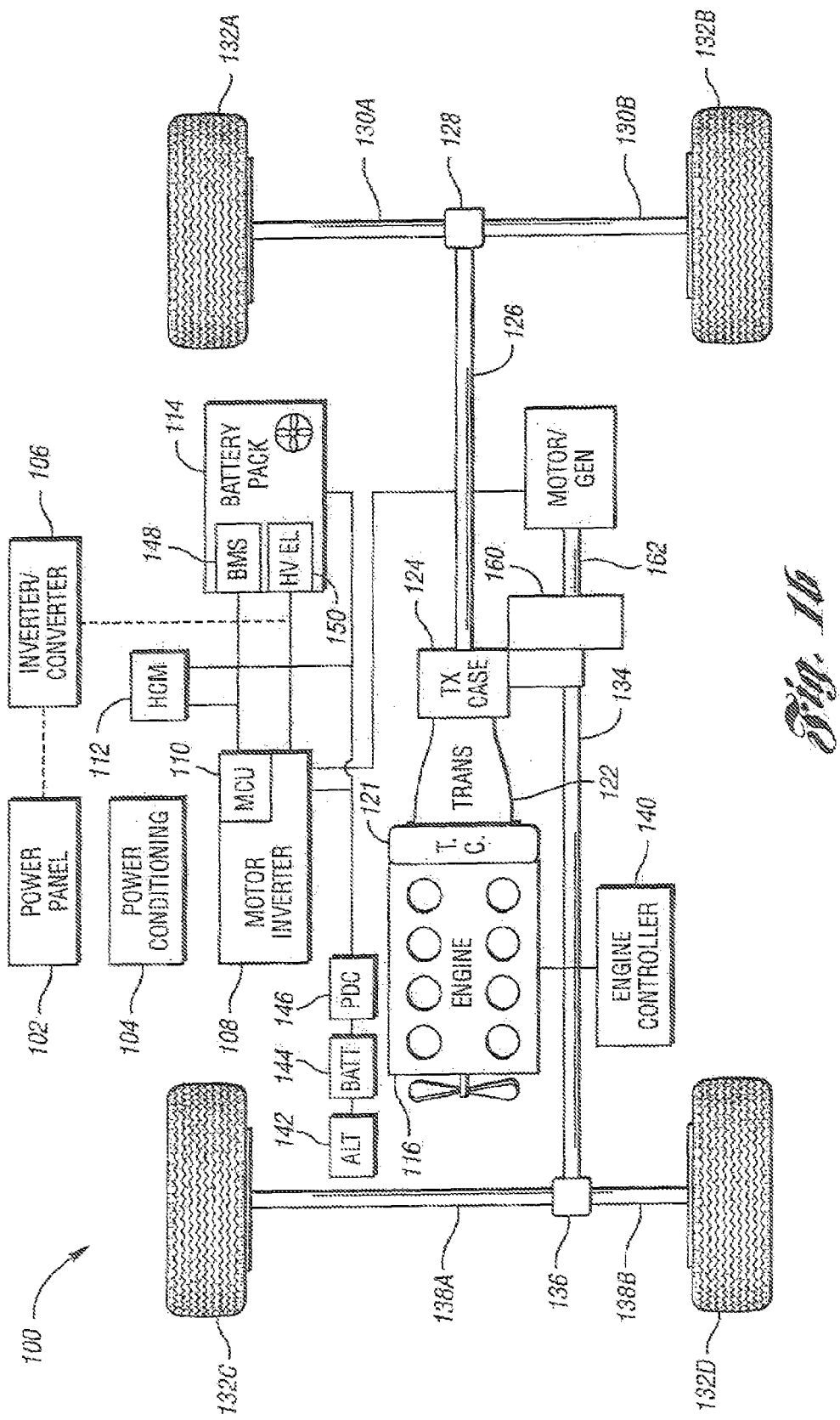
FIG. 1b is a block diagram for a hybrid vehicle equipped with a combined motor/starter generator coupled to the vehicle drive train via a power take-off unit and arranged in accordance with the principles of the invention.

Rather than being integrated with a flywheel of vehicle 100 as shown in FIG. 1, the starter/motor generator unit 120 could be coupled, directly or via a power take-off unit at another location of the vehicle's drive train, such as shown in FIG. 1b. As seen from FIG. 1b, unit 120 could be coupled via rotating draft 162 to power take-off unit 160, which is capable of transferring power to (motor or starter mode) or receiving power from (generator mode) the vehicle's drive train. It is also to be understood that the arrangement of FIG. 1b may be used with two-wheel or four-wheel drive systems.

As will be explained in more detail in a later section of this description, power panel 102 provides a variety of AC and/or DC power outlets at the vehicle for use in powering auxiliary electrical loads, for example, loads external to the vehicle.

Optionally, an inverter in unit 106 may be provided between battery pack 114 and power panel 102 to generate AC electrical power directly from battery pack 114. It will also be understood that DC electrical power may be provided to power panel 102 directly from battery pack 114 or via a DC/DC converter in unit 106.

Hybrid control module 112 is used to determine the operating mode of the hybrid vehicle and to automatically make selective changes at the transmission 122 and, for four-wheel drive systems, the transfer case 124 under circumstances requiring furnishing of electrical energy to power panel 102 or other conveniently located powder outlets as will be explained in further detail in a later section of this description.

Hybrid vehicle 100 is capable of operating in four modes—one stationary and three moving. In a first mode, principally employed when the vehicle is starting out and at low speeds or stopped in traffic, only starter/motor/generator unit 120 supplies power to the drive lines. In this "stealth" mode, unit 120 is functioning as an electric motor powered by battery pack 114.

As the road speed of hybrid vehicle 100 increases, internal combustion engine 116 is started using torque provided by starter/motor/generator unit 120 in a starter mode. Engine 116 is typically designed to operate near maximum efficiency during steady state cruising at high speeds, e.g., 35-65 mph. During these times, unit 120 is not powered, and the hybrid vehicle 100 operates in the engine-only mode.

When necessary for acceleration or elevation climbing, unit 120 is powered up to add its torque to that of internal combustion engine 116, thus placing hybrid vehicle 100 in a combined engine-motor mode.

The fourth mode of operation is to utilize hybrid vehicle 100 as a source of power for auxiliary electrical loads, such as those external to the vehicle. As explained in more detail below, in the power generation mode, hybrid vehicle 100 is placed in an operating configuration suitable for providing power to auxiliary loads. For example, in the case of a vehicle equipped with four-wheel drive and a power transfer case 124 (FIG. 1), and for an external load to be powered, vehicle 100 is held stationary via an electronic parking brake system, the transfer case is placed in neutral, and a desired internal combustion engine speed in a preselected drive gear is employed to drive unit 120 in a generator mode in an environmentally-friendly manner for supplying various levels and types of AC and/or DC power to a plurality of outlets at deployable power panel 102. Alternatively, for a vehicle 100 equipped with an automatic transmission, the electronic parking brake system would be unnecessary, if the generator 120 is driven with the vehicle held stationary via placing the automatic transmission in PARK. In yet another alternative application, generator 120 could be used to power an outlet located in the interior cabin of vehicle 100. In this application, it would be unnecessary to keep the vehicle stationary.

With continued reference to FIG. 1, hybrid control module 112 is used to determine a proper operating mode of vehicle 100. Module 112 acts in response to inputs generated within vehicle 100, or, optionally, via input received from a remote transmitter/receiving unit 170. Unit 170 could, for example, comprise a key fob or a stand-alone hand-held device. Unit 170 has a set of key switches 172 for transmitting commands to module 112 and a display or set of indicators 171 for receipt of status signals from module 112. The remote control option enables a user to start and stop the engine 116 for providing power to loads and to be apprised of conditions such as low fuel or out-of-range voltages.

With reference to FIG. 2, a side perspective view of a pick-up truck 200 equipped with a deployable power panel 102 is shown. While, for the sake of example, a pickup truck is shown, it is to be understood that the invention is applicable to any type of vehicle.

Hybrid truck vehicle 200 stows deployable panel 102 in a latched "up" position shown in phantom in FIG. 2 on, for example, the passenger side 202 of the truck between the passenger door 212 and rear wheel 210. With this arrangement, cargo bed 208 of vehicle 200 is not required to contain a separate generator or power panel therefor. This approach also eliminates the need for unique body panels as compared to those used on a conventional truck of identical body design. It will be understood that panel 102 could be positioned at other locations of vehicle 202.

To deploy panel 102, conventional latches are disengaged allowing panel 102 to be lowered from the stowed position to the deployed position shown in FIG. 2. Alternatively, panel 102 could be electrically, pneumatically or hydraulically powered between the stowed and deployed positions. Lowering unit 102 could automatically operate a "generate request" switch which signals hybrid control module 112 of FIG. 1 to begin a programmed sequence placing the vehicle in an operating state appropriate for supplying power to various outlets of panel 102, each equipped with an appropriate circuit breaker. Alternatively, the "generate request" could be generated via a manually operated switch. A watertight door is then manually or automatically opened for access to the power outlets of panel 102.

Two examples of external electrical loads are illustrated in FIG. 2. Electric drill 204 is powered by a 110 VAC outlet of panel 102, while electric air compressor 206 is driven from a 220 VAC outlet of panel 102.

Figure 3A:
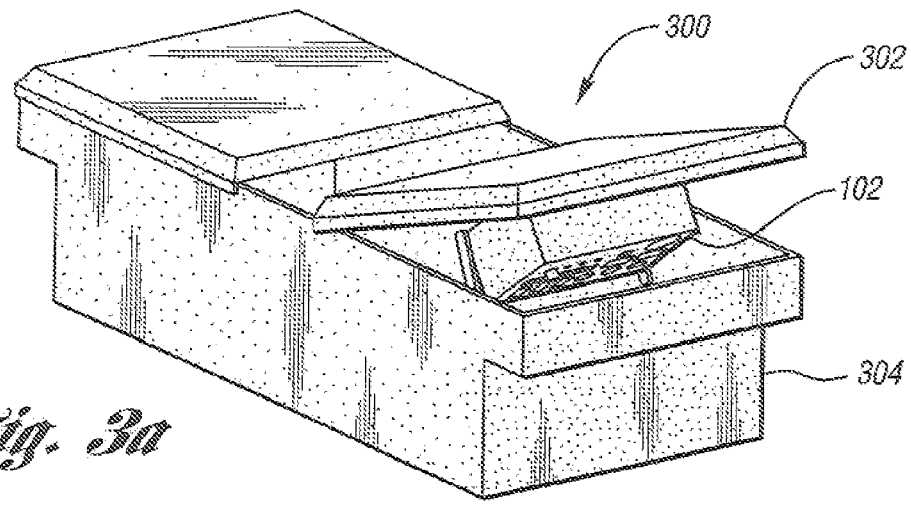
FIGS. 3a, 3b and 3c present views of a truck cargo bed mounted toolbox in three stages of opening, the toolbox having an alternative deployable input/output power panel disposed therein.
Figure 3B:
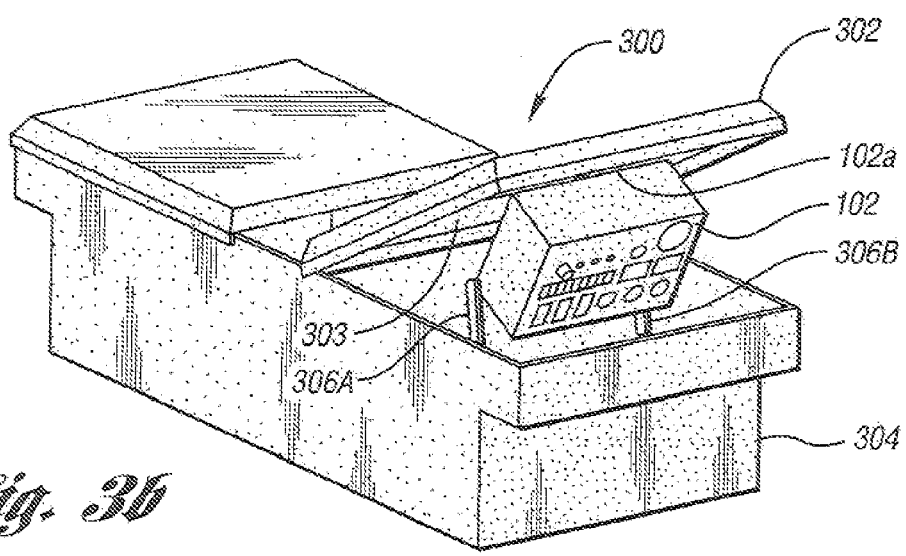
Figure 3C:
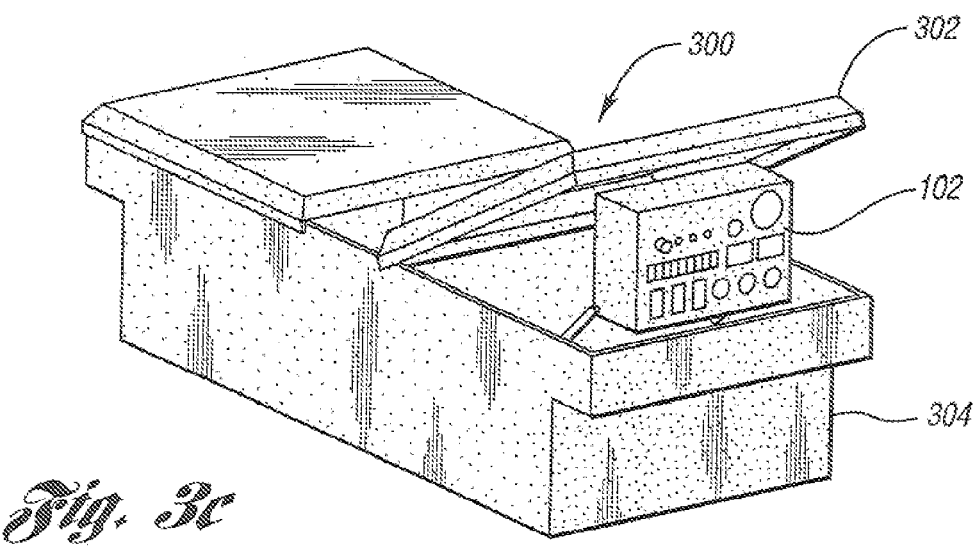

FIGS. 3A, 3B and 3C depict a second embodiment of a deployable power panel 102 wherein panel 102 is located inside a portion of a toolbox 300 mounted to the hybrid vehicle, for example, in the cargo bed area adjacent a rear outer panel of the vehicle's cab.

In FIG. 3A, a hanged lid 302 is beginning to be raised from its horizontal closed position to reveal unit 102 stored in portion 304 of toolbox 300.

In a further opened state shown in FIG. 3B, unit 102 is shown to be hingedly coupled at its rear corner 102a to an inner surface 303 of lid 302. At a bottom side of unit 102 are pivotally mounted struts 306A and 306B. Distal ends of struts 306A, B are also pivotally coupled to toolbox 300.

In the deployed state of unit 102 shown in FIG. 3C, the panel is substantially vertical. In this position, a generation request signal switch is automatically or manually activated to signal hybrid control module 112 of FIG. 1 accordingly.

FIG. 4 depicts a third embodiment of a deployable power outlet panel. In this version, output panel 402 is positioned, for example, in the passenger side outer wall 406 of the cargo bed of vehicle 400 with a sealed waterproof door or covering 404 covering the panel in the stowed position. Alternatively, panel 402 could be equipped with waterproof connectors and an access opening 408 could be provided in cover 404 for receipt therethrough of an electrical cable for powering a load from panel 402 with door 406 in a closed position.

To deploy panel 402, the user pulls on a handle of an outer surface of cover 404 to swing cover 404 down to reveal panel 402. Opening door 404 will automatically or manually activate a generation request switch to signal hybrid control module 112 of FIG. 1.

Figure 5:
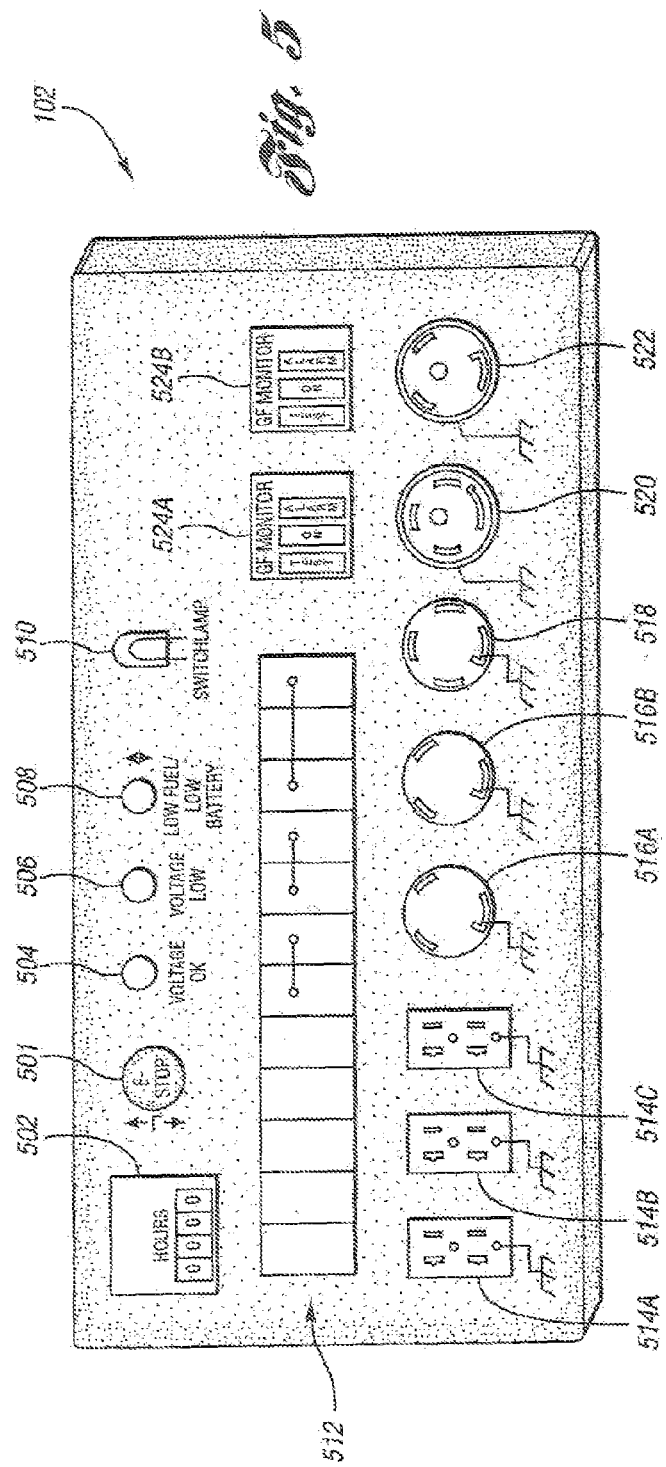
FIG. 5 is a front view of an exemplary array of power outlets, indicators and other devices of the input/output panel of FIGS. 2-4.

With reference to FIG. 5, exemplary details of the items located at a front face of power panel 102 are set forth. Generator unit 120 run time indicator 502 displays the total time that internal combustion engine 116 of FIG. 1 is driving unit 120 in a generator mode. This run time can be used in addition to a vehicle odometer to schedule periodic maintenance for internal combustion engine 116. Alternatively, indicator 502 could simply display total run time of engine 116 (FIG. 1).

E-stop switch 501 is an emergency stop button for shutting off power generation to panel 102.

Circuit breaker panel 512 provides an appropriate breaker for each of the accessible power outlets of the unit. Those outlets equipped with ground fault interruption are provided with ground fault monitor units 524A, B.

Indicator lamp 504 is activated to show normal output voltages available, while indicator lamp 506 shows that a low output voltage condition exists. Indicator 508 indicates a low fuel or low battery condition for internal combustion engine 116. Indicator lamp 510 signals that a power generation request has been generated and panel outlets are powered.

Any desired complement of one, two or three phase AC outlets can be provided at panel 102. As an example only, panel 102 of FIG. 5 has two 120 VAC 20 ampere outlets 514B and C, one filtered ground fault protected 120 VAC 20 ampere outlet 514A, two 120 VAC 30 ampere outlets 516A and B, two two-phase 240 VAC 30 ampere outlets 518 and 520 and a three-phase 240 VAC 30 ampere outlet 522.

In addition to conventional 60 Hz, the frequency of the voltages provided via the various outlets of panel 102 may optionally be switched to other frequencies which have been programmed into, for example, the hybrid control module 112 of FIG. 1. Furthermore, if necessary panel 102 could provide one or more DC outlets.

Figure 6:
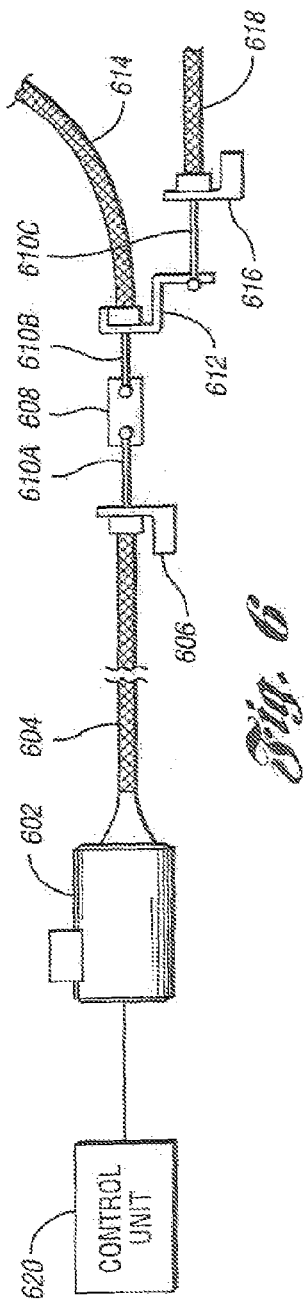
FIG. 6 is a block diagram of an electronic parking brake automatic actuating system for a vehicle arranged in accordance with the principles of the invention.

In order for vehicle 100 to supply electrical power to external loads, it must be held in a stationary position, yet drive generator unit 120 with internal combustion engine 116 in an environmentally friendly manner. With reference to FIG. 6, a block diagram of an electric parking brake actuating system is set forth for actuating a conventional parking brake system for the hybrid vehicle.

Microprocessor-based control unit 620 can be a separate unit or, preferably, part of hybrid control module 112 of FIG. 1. The controller is coupled for controlling brake actuating motor 602 which is equipped with gear ratios suitable for pulling actuator wires housed in cable 604 via a screw thread member mounted to an end of the actuating wire.

At support bracket 606, input wire 601A is coupled to a tension adjusting plate 608. Movable bracket 612 is then used to translate the motion of wire 610A to two wires 160B of cable 614 and wire 610C of cable 618. Cable 614 is associated with the braking mechanism for one vehicle wheel and cable 618 is associated with the braking mechanism for a second vehicle wheel.

Figure 7:
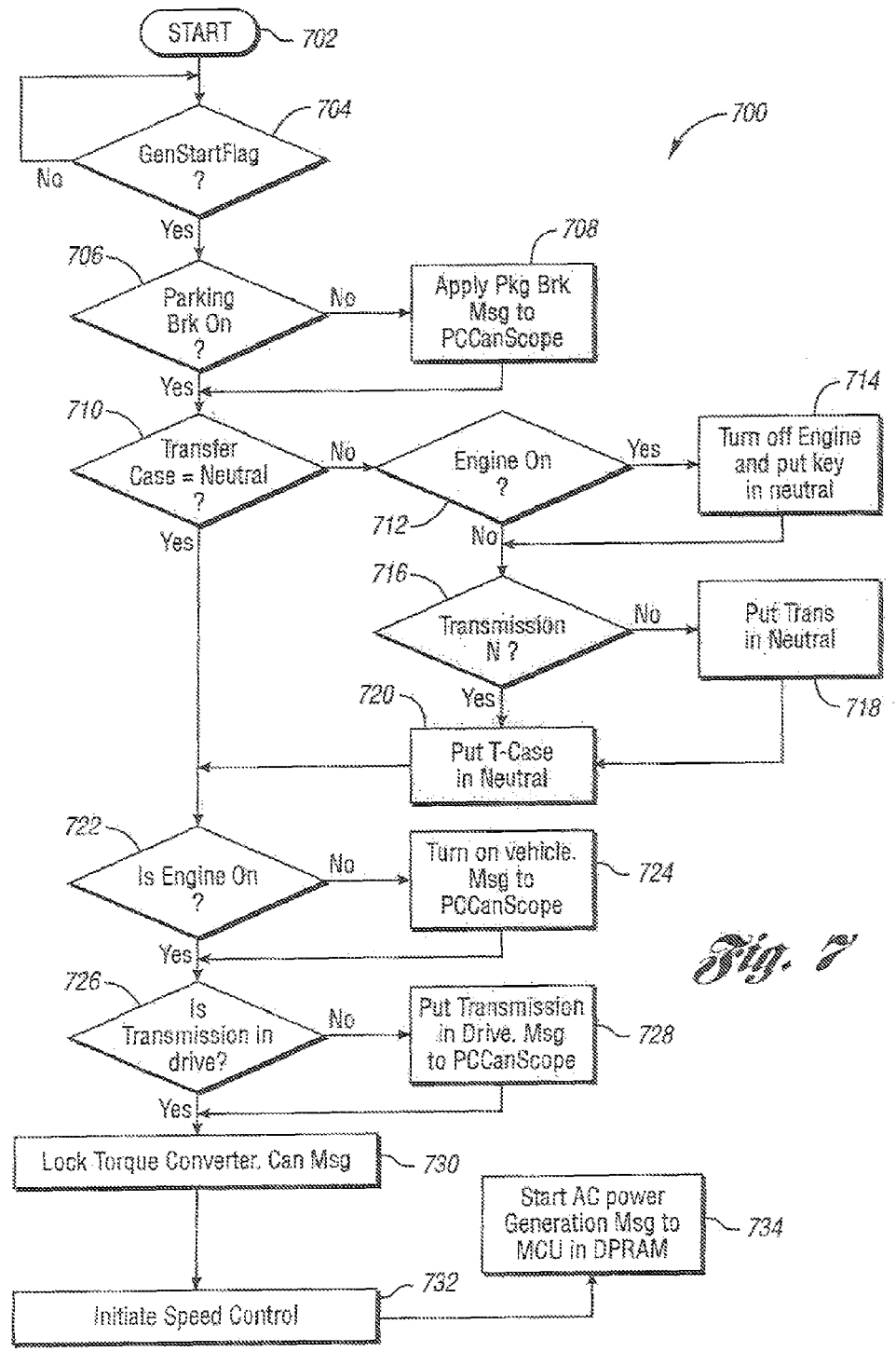
FIG. 7 is a flow chart of a vehicle controller program for automatically actuating the electronic parking brake during generation of power for loads external to the hybrid vehicle.

FIG. 7 sets forth a flow chart of a routine performed by hybrid control module 112 of FIG. 1 whenever it is desired to supply electric power to external loads from the drive train of hybrid vehicle 100 operating in a pre-programmed gear for environmentally-friendly operation.

The routine 700 is entered at start 702 and proceeds to a test for the presence of a generator start flag in memory of the controller 112. The generator start flag is set upon receipt by hybrid vehicle control module 112 of a generator request signal which is generated as a result of deploying power output panel 102 as described above.

When a generator start flag is detected at decision step 704, the routine proceeds to decision block 706 to determine whether the electric parking brake has been actuated to hold the vehicle in a stable position.

If the electric parking brake has not been activated, the routine proceeds to step 708 where a signal to the parking brake system controller begins the actuation process. Additionally, in step 708 a message is generated for display to the vehicle operator. If step 706 determines that the electric parking brake is already applied, then the routine proceeds to decision block 710 to determine whether the transfer case 124 of vehicle 100 has been placed in neutral. If the transfer case has not been placed in neutral, the routine proceeds to decision block 712 where it is determined whether or not the internal combustion engine 116 of vehicle 100 is on.

If the internal combustion engine is on, then the routine proceeds to step 714 where the engine is turned off and the key placed in a neutral ignition position. If the engine is not running at step 712, then the routine proceed to decision block 716 where the transmission state is checked for neutral. If the transmission is not in neutral, the routine proceeds to step 718 where the transmission is automatically placed in neutral by apparatus to be described in a later section of this description.

If the transmission is in neutral, then the routine proceeds to step 720 where the transfer case 124 of FIG. 1 is placed in neutral. The routine then proceeds to decision block 722.

At decision block 722, the engine is tested for on or off state. If the engine is not on, the routine proceeds to step 724 where the engine is turned on and a message indicating that is sent to an operator display.

If the engine is on at decision block 722, the routine proceeds to decision block 726 where the transmission is checked as to whether or not it is in a preselected drive gear.

If the transmission is not in the preselected drive gear, the routine proceeds to step 728, the transmission is placed in a preselected drive gear and a message to that effect is sent to the operator display.

If the transmission is in drive, the routine proceeds to step 730 where the torque converter 121 of FIG. 1 is locked and a message reflecting that state is placed on the vehicle's communication bus.

The routine next proceeds to step 732 where speed control of internal combustion engine 116 is initiated to bring the generator unit 120 to a desired rotational speed. The routine then proceeds to step 734 where power is supplied to power panel 102 and a message indicating that the generation state is in progress is sent to the motor control unit 110 of FIG. 1 in the unit's random access memory. The routine will stay in step 734 until a power off request is received by the hybrid vehicle control module 112.

Figure 8:
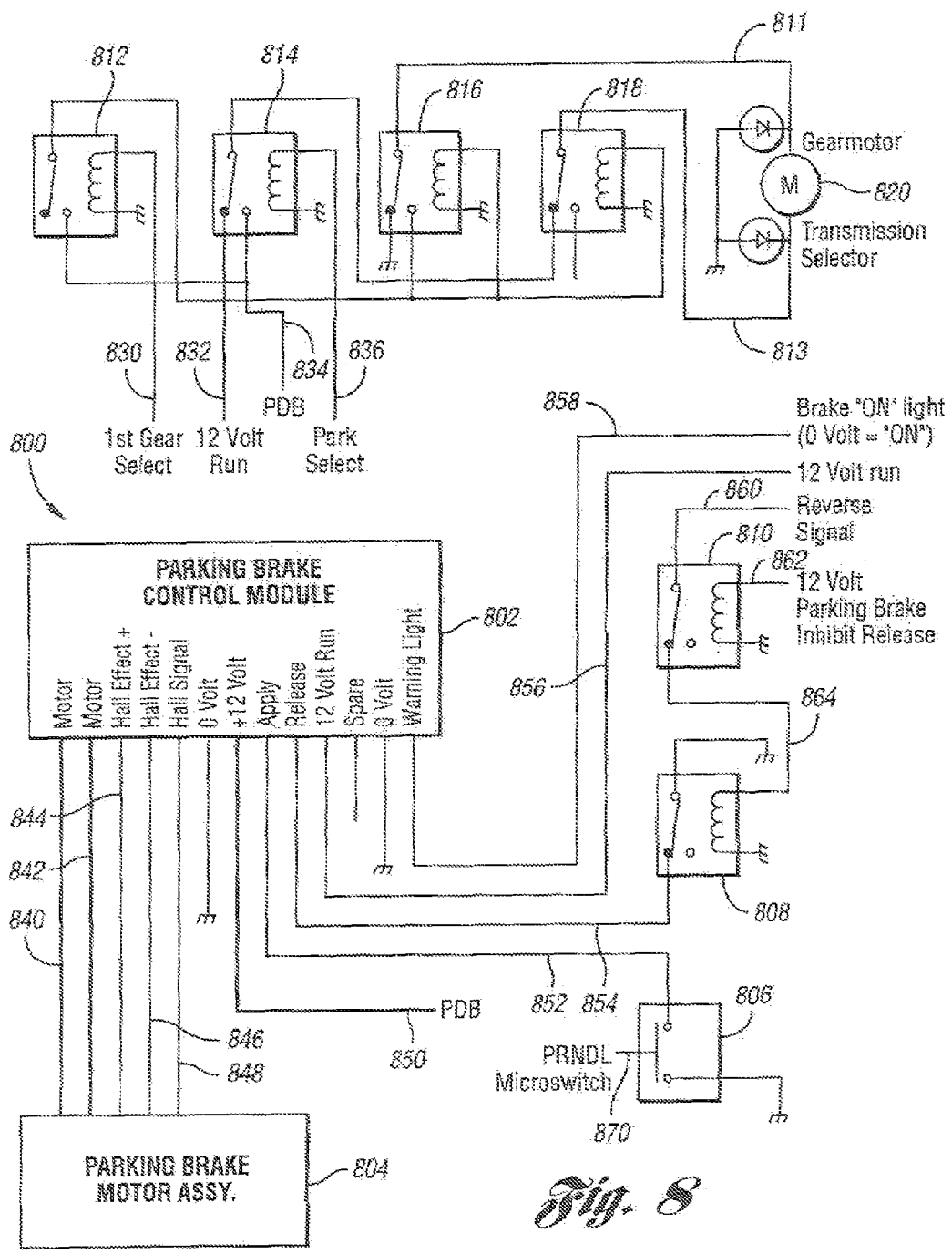
FIG. 8 is a block diagram of the relay logic for controlling the parking brake application and automatic setting of the transmission gear for driving the combined starter/motor/generator as a generator.

FIG. 8 sets forth a block diagram of the basic logic circuitry for controlling operation of the electric parking brake system.

With reference to FIG. 8, parking brake control module 802 controls the motion and direction of brake actuator motor 602 of FIG. 6. This motor is represented in block diagram form in FIG. 8 as part of parking brake motor assembly 804. Leads 840 and 842 from control module 802 power the motor in opposite directions. Hall effect leads 844, 846 and 848 are used to sense the number of gear teeth which pass by the Hall device in motor brake assembly 804 to determine the distance that the actuating cables have traveled.

A positive DC voltage is applied to the control module via lead 850 coming from the power distribution bay fuse panel of the hybrid vehicle. Whenever PRNDL micro-switch 870 is actuated, a ground signal is applied via lead 852 to control module 802 to indicate that the parking brake should be applied to the vehicle. Switch 870 will be actuated by the movement of the vehicle's PRNDL gear shift select lever.

Control module 802 will initiate release of the electric parking brake whenever it receives a ground signal at lead 854 from relay 808's normally closed contact. A selectively switchable voltage signal from the vehicle's hybrid control module 112 of FIG. 1 is selectively applied to lead 856 to control module 802. Module 802 will actuate a warning light via lead 858 to indicate to the hybrid control module 112 of FIG. 1 that the electric brake system is on.

Whenever the hybrid control module 112 indicates that a reverse gear has been selected, it will place a positive voltage signal on lead 860 which will actuate relay 808 to prevent the application of a release signal to the parking brake system. Additionally, whenever power generation to external loads is taking place, hybrid control module 112 will place a positive voltage on lead 862 to operate relay 810 which will then open its contact to additionally prevent the electric parking brake from being released.

Parking brake control module 802 and parking brake motor assembly 804 are commercially available units from sources such as Dura Corporation.

Relays 812, 814, 816 and 818, in conjunction with control signals received from hybrid control module 112 of FIG. 1, control the motion of motor 820 to automatically shift gears at transmission 122 into or out of PARK, thus bypassing the action of the conventional PRNDL gear selection lever.

The operating coil of relay 812 is energized by a voltage signal on lead 830 from hybrid control module 112 indicating that a pre-programmed drive gear of transmission 122 is to be automatically selected by gear motor 820. Actuation of relay 812 will then operate slave relays 816 and 818. With relays 812, 816 and 818 on and relay 814 off, a positive voltage at lead 834 from the power distribution fuse box of the hybrid vehicle will be placed on lead 811 to motor 820 via operated contacts of relays 812 and 816. Simultaneously, operation of relay 818's contact will place ground potential on lead 813 to motor 820, thus causing motor 820 to turn in a first direction to by-pass the PRNDL lever to place the transmission 122 in a pre-programmed gear.

Conversely, when hybrid control module 112 indicates via lead 836 that transmission 122 is to be returned to PARK, relay 814 will operate and relays 812, 816 and 818 will release. With relay 814 on, and relays 812 and 816 and 818 off, ground potential will be placed on lead 811 via a normally closed contact of relay 816. Simultaneously, a positive drive voltage from the power distribution fuse box on lead 834 will be placed on lead 813 to motor 820 via an operated contact of relay 814 and a normally closed contact of relay 818. This reversed polarity on motor leads 811 and 813 will cause gear select motor 820 to rotate in a second direction causing transmission 122 to be placed in PARK.

PARK may additionally be automatically selected by motor 820 whenever the transmission is not in the preprogrammed drive gear nor in PARK, and hybrid control module 112 places a positive 12-volt signal on lead 832.

For vehicles supplying electric power while the power train is placed in the PARK gear of an automatic transmission, the electric brake and logic circuitry of FIG. 8 would not be required. In such an operating condition, the routine shown in FIG. 9 could be run by hybrid control module 112 of FIG. 1

Figure 9:
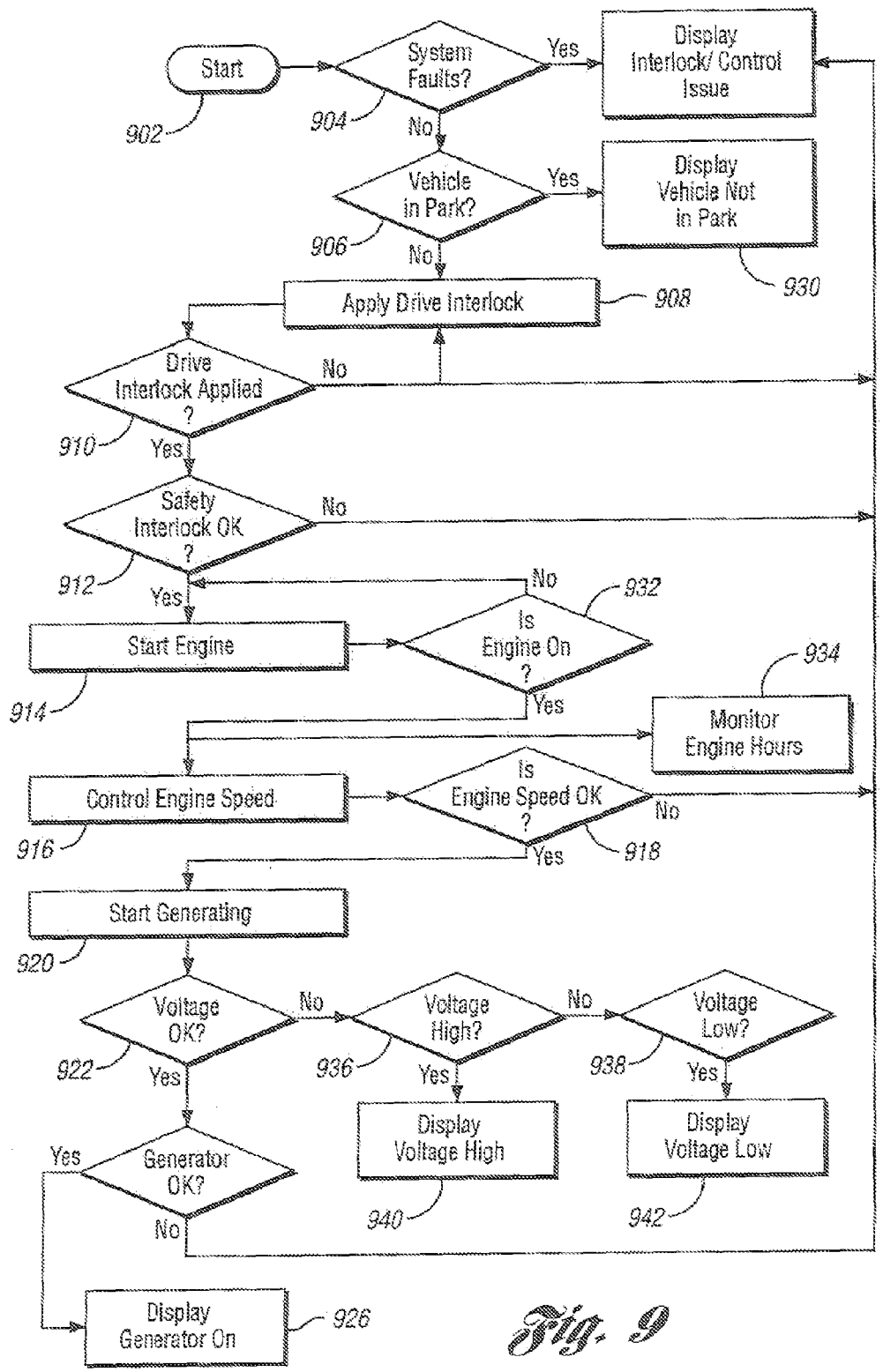
FIG. 9 is a flow chart of a vehicle controller program for ensuring a vehicle is in a proper operating state for supplying electric power to loads external to the hybrid vehicle without use of an electronic parking brake.

With reference to FIG. 9, routine 900 begins at start 902 whenever a generator request signal is initiated, for example, when power output panel 102 is deployed as previously described. The routine then proceeds to decision block 904 where a determination of the existence of any vehicle system faults is made. Such faults could involve low fuel condition, improper coolant temperature, etc. If a fault exit, the routine enters block 928, displays the nature of the fault and terminates.

If no system faults are detected, the routine passes to decision block 906 to determine whether the vehicle's automatic transmission is in PARK. If the transmission is not in park, the routine generates an appropriate display message at block 930 and then terminates.

If the transmission is determined to be in PARK, the routine applies drive interlock at step 908 and proceeds to decision block 910 to verify that a drive interlock has been enabled to prevent the transmission from leaving the PARK state for so long as a generate request signal is present. If drive interlock is not enabled, the routine displays an appropriate message at block 928 and terminates.

If drive interlock is enabled, routine 900 proceeds to decision block 912 to verify whether the electrical generating system safety interlocks are enabled. These tests are basically checks for a normally functioning electric power generating system. For example, the tests could include a test for tripped circuit breakers or for absence of ground fault, etc. If all safety interlocks are not satisfied, routine 900 generates an appropriate message for display at block 928 and terminates.

If safety interlocks are satisfactory, the routine proceeds to block 914 where the vehicle's internal combustion engine is automatically started. Once the engine operation is verified at decision block 932, a speed control regimen at block 916 is entered. If a desired engine speed is not satisfied at decision block 918, an appropriate message is displayed at bock 928 and the routine terminates.

If the engine is operating at the preselected speed, electric power generation begins at block 920. The generated output voltage is checked for being within a proper tolerance range at decision blocks 922, 936 and 938, with appropriate messages displayed for high or low voltage at blocks 940 and 942, respectively.

Proper generator operability is identified at decision block 924, and if verification passes, a "generator on" indication is displayed. Under a generator malfunction, an appropriate message is displayed at block 928, and routine 900 terminates.

The above description of the invention is merely exemplary, and variations that do not depart from the gist of the invention are intended to be within the scope thereof.

What is claimed is:

1. In a vehicle having an internal combustion engine, an electrical generator adapted for coupling to the engine, a transmission and a deployable power distribution unit coupled to the electrical generator for furnishing electrical power to a load external to the vehicle, a method for placing the vehicle in an operative state suitable for supplying electrical power to the external load, the method comprising:
   recognizing movement of the power distribution unit to a deployable state;
   holding the vehicle stationary; and
   placing the transmission in a preselected gear for powering the electrical generator.

2. The method of claim 1 further comprising delaying transfer of electrical power from the generator to the power distribution unit until the engine has reached a preselected rotational speed.

3. The method of claim 1 where the transmission comprises an automatic transmission and the preselected gear is PARK.

4. The method of claim 1 wherein the vehicle further comprises a mechanical power transfer unit for selectively coupling drive power from the transmission to a drive train of the vehicle, and wherein the method further comprises actuating a parking brake system to hold the vehicle stationary and placing the mechanical power transfer unit in a neutral state wherein drive power is decoupled from the drive train prior to placing the transmission in a preselected gear.

5. The method of claim 4 wherein the preselected gear comprises a drive gear.

* * * * *